(12) United States Patent
Ogawa et al.

(10) Patent No.: US 6,558,001 B2
(45) Date of Patent: May 6, 2003

(54) PROJECTOR

(75) Inventors: Yasunori Ogawa, Suwa (JP); Satoshi Yoshida, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/887,017

(22) Filed: Jun. 25, 2001

(65) Prior Publication Data

US 2002/0012104 A1 Jan. 31, 2002

(30) Foreign Application Priority Data

Jun. 30, 2000  (JP) .................................. 2000-197674

(51) Int. Cl.[7] .......................... G03B 21/14; G03B 21/00
(52) U.S. Cl. ........................................ 353/31; 353/84
(58) Field of Search ............................. 353/30, 31, 33, 353/34, 81, 84

(56) References Cited

U.S. PATENT DOCUMENTS

| | | | | |
|---|---|---|---|---|
| 4,943,154 A | * | 7/1990 | Miyatake et al. | 348/751 |
| 5,626,409 A | * | 5/1997 | Nakayama et al. | 353/31 |
| 6,000,802 A | * | 12/1999 | Hashizume et al. | 349/5 |
| 6,043,797 A | * | 3/2000 | Clifton et al. | 345/589 |
| 6,309,073 B1 | * | 10/2001 | Nakayama et al. | 353/200 |

* cited by examiner

Primary Examiner—Alan A. Mathews
Assistant Examiner—Andrew Sever
(74) Attorney, Agent, or Firm—Oliff & Berridge, PLC

(57) ABSTRACT

The present invention provides a technique that reduces color non-uniformity in a color image projected and displayed by a projector. The projector that projects and displays the color image includes an illumination optical system, a color light separation optical system, first through third electro-optical devices, a color light synthesizing optical system, and a projection optical system. The projector generally has one or a plurality of light bundle adjustment optical systems provided in one or some of three optical paths, which respectively connect the color light separation optical system with the first through the third electro-optical devices. Each light bundle adjustment optical system regulates size of a light bundle of a selected color light. The technique of the present invention adjusts specific one or plural image signals according to pixel positions of a color image, so that cross sectional luminance distributions of first through the third modulated lights on a light-exiting side of the color light synthesizing optical system have substantially the same gradients at least when the image of interest to be projected and displayed is a white image. This arrangement effectively reduces color non-uniformity in the resulting color image, due to the presence of the light bundle adjustment optical system.

14 Claims, 11 Drawing Sheets

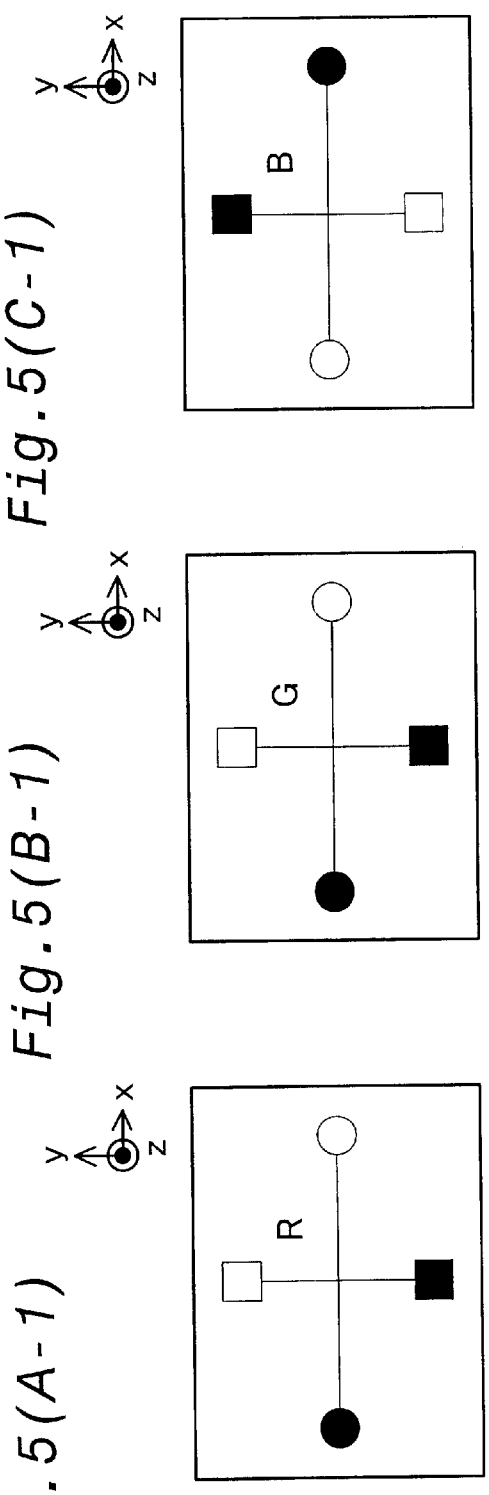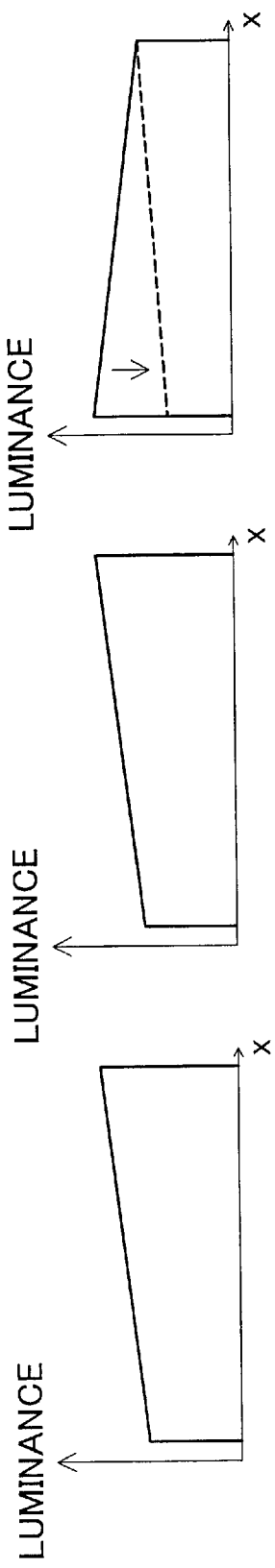

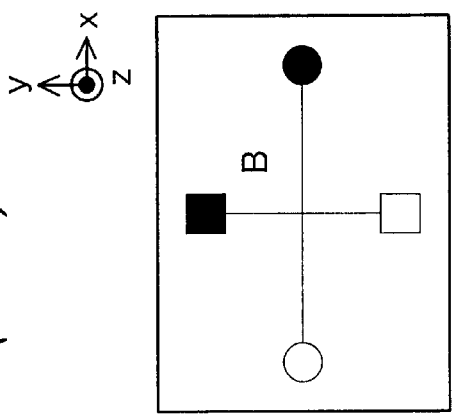
Fig.7(A-1)  Fig.7(B-1)  Fig.7(C-1)
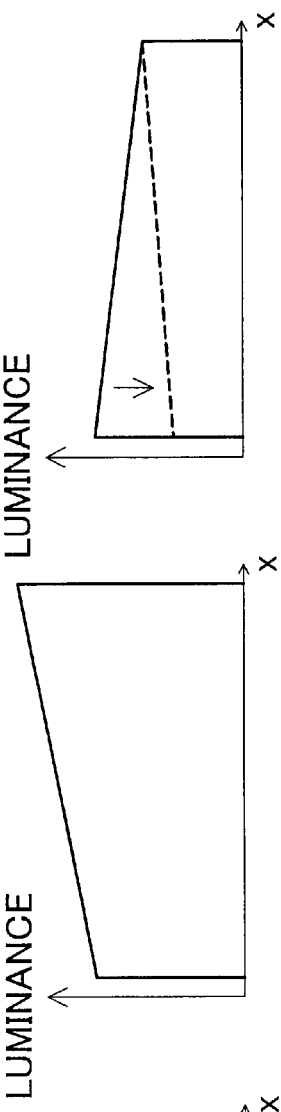
Fig.7(A-2)  Fig.7(B-2)  Fig.7(C-2)

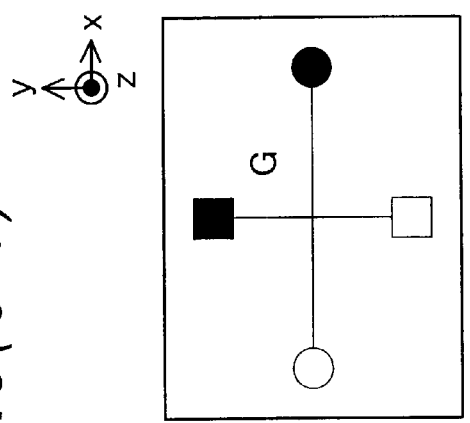
Fig.9(C-1)
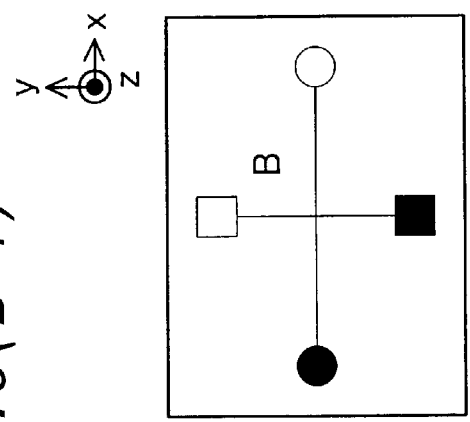
Fig.9(B-1)
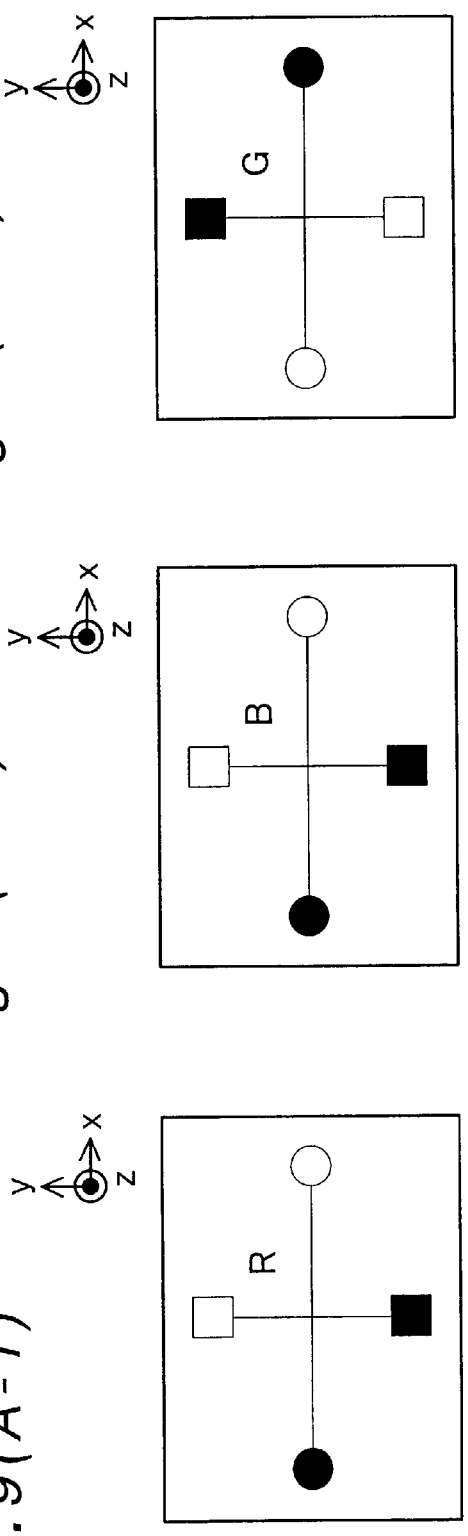
Fig.9(A-1)
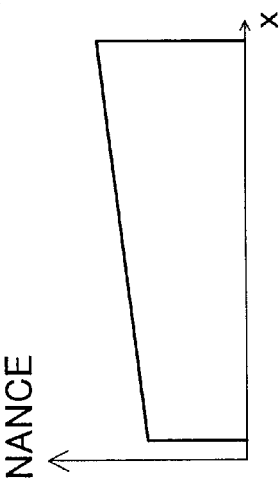
Fig.9(C-2)
Fig.9(B-2)
Fig.9(A-2)

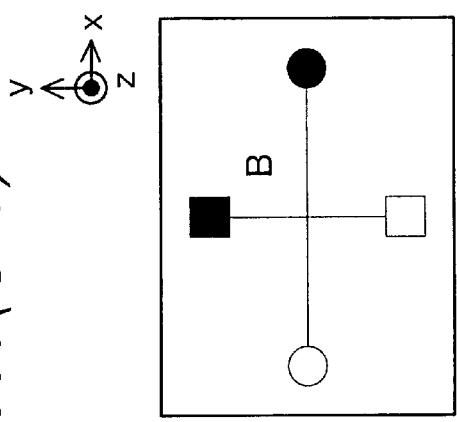
Fig.11(A-1)
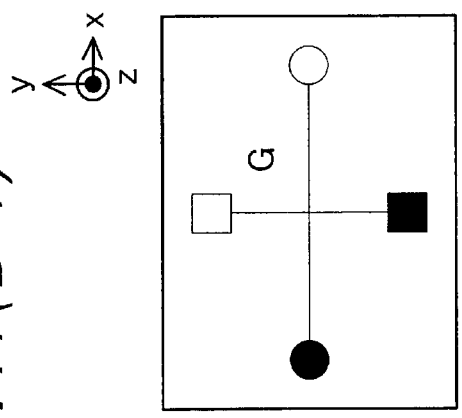
Fig.11(B-1)
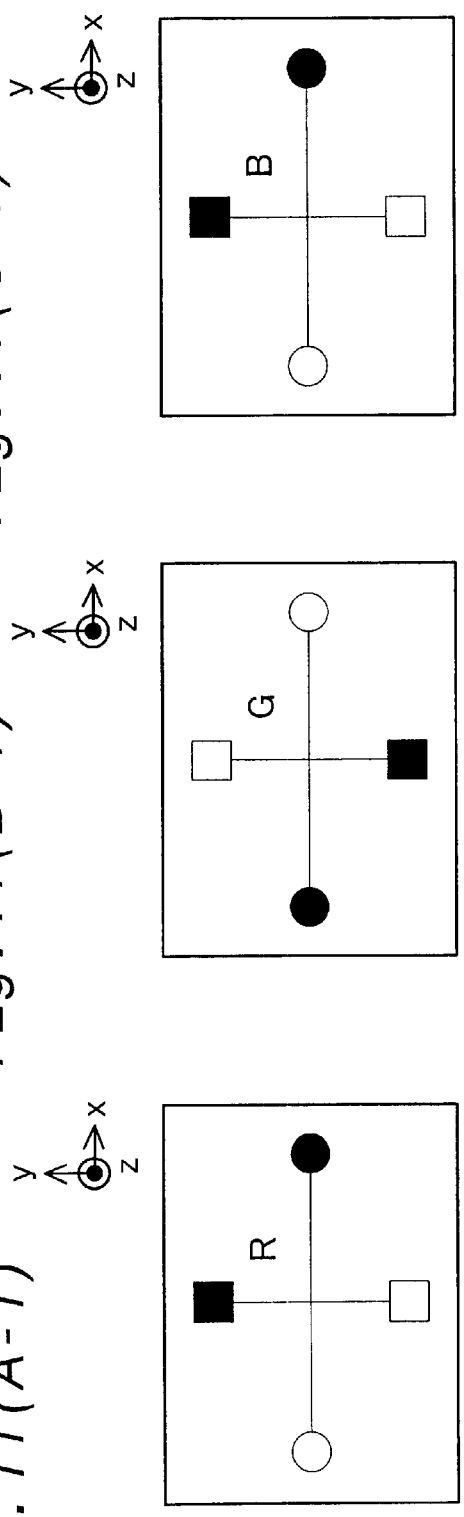
Fig.11(C-1)
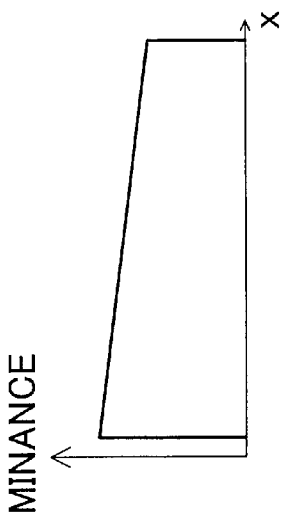
Fig.11(A-2)
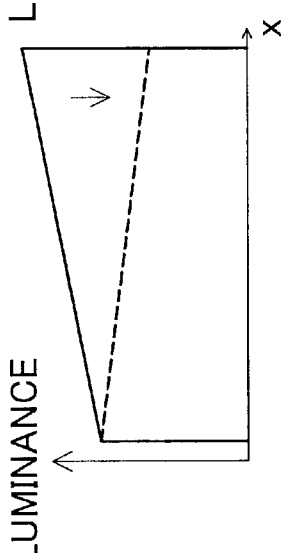
Fig.11(B-2)
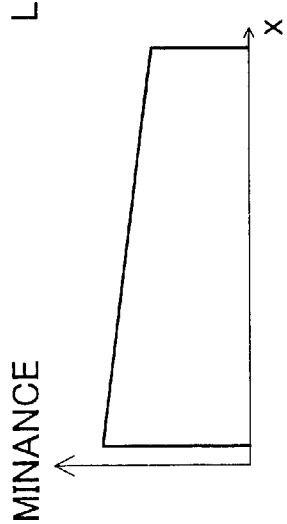
Fig.11(C-2)

PROJECTOR

BACKGROUND OF THE INVENTION

1. Field of the Invention

The present invention relates to a projector that projects and displays color images.

2. Description of the Related Art

Liquid crystal panel projectors typically have an illumination optical system for emitting illumination light, a color light separation system for separating the illumination light into three color lights, red (R), green (G), and blue (B), three liquid crystal light valves for modulating the respective color lights in response to image information (image signals), a color light synthesizing optical system for synthesizing the three modulated color lights with one another to synthesized light, and a projection optical system for projecting the synthesized light on a screen.

A relay optical system including a lens is generally provided in at least one optical path among three optical paths of the three color lights, in order to cause the light bundles (bundles of rays) of the respective color lights entering the three liquid crystal light valves to have substantially equal sizes. The presence of the relay optical system, however, leads to color non-uniformity in the resulting color image projected and displayed on the screen.

The relay optical system converges and re-diverges the light bundle (bundle of rays) of the color light passing through the relay optical system. The relay optical system accordingly turns the cross sectional luminance distribution of the color light upside down and left-side right. In the case where the color lights emitted from the illumination optical system and illuminate the respective liquid crystal light valves have non-uniform cross sectional luminance distributions, the synthesized light, which is obtained by synthesizing the modulated color light passing through the relay optical system with the other modulated color lights not passing through the relay optical system, includes the modulated color light having the inverted cross sectional luminance distribution. This undesirably causes color non-uniformity in the resulting color image projected and displayed on the screen.

SUMMARY OF THE INVENTION

The object of the present invention is thus to provide a technique that reduces color non-uniformity in a color image projected and displayed by a projector.

At least part of the above and the other related objects is attained by a first projector that projects and displays a color image. The first projector includes: an illumination optical system that emits illumination light; a color light separation optical system that divides the illumination light emitted from the illumination optical system into first through third color lights, which respectively have three different color components; first through third electro-optical devices that respectively modulate the first through the third color lights, which are separated by the color light separation optical system, in response to first through third image signals and thereby generate first through third modulated lights; a color light synthesizing optical system that synthesizes the first through the third modulated lights with one another and emits synthesized light; a projection optical system that projects the synthesized light emitted from the color light synthesizing optical system; a relay optical system that is provided in one optical path selected out of three optical paths, which respectively connect the color light separation optical system with the first through the third electro-optical devices, the relay optical system regulating a size of a light bundle of a selected color light entering the corresponding electro-optical device; and an adjustment section that adjusts a specific image signal, which is one out of the first through the third image signals and corresponds to the electro-optical device that receives the selected color light passing through the relay optical system, a degree of the adjustment being depend on pixel positions of a color image so that cross sectional luminance distributions of the first through the third modulated lights on a light-exiting side of the color light synthesizing optical system have substantially same gradients at least when the first through the third image signals reproduce a white image.

The first projector of the present invention has the adjustment section that carries out the adjustment, so that cross sectional luminance distributions of the first through the third modulated lights on a light-exiting side of the color light synthesizing optical system have substantially same gradients at least when the first through the third image signals reproduce a white image. The adjustment section functions to reduce color non-uniformity in the white image even when the light bundle of the color light passing through the relay optical system is converged and re-diverged. This arrangement thus effectively reduces the color non-uniformity in the color image projected and displayed by the projector.

The first projector advantageously reduces the color non-uniformity by simply adjusting only one image signal corresponding to the electro-optical device that receives one color light passing through the relay optical system.

In the first projector, it is preferable that the selected color light passing through the relay optical system is a color light having the highest luminance among the first through the third color lights.

The cross sectional luminance distribution of one color light having the highest luminance is accordingly reverse both vertically and horizontally to the cross sectional luminance distributions of the two residual color lights. The arrangement substantially equalizes the luminance of each modulated color light by adjusting only the image signal corresponding to the electro-optical device that receives the one color light having the highest luminance. This ensures the accurate reproduction of the hue of the color image.

It is here assumed that a color light having a relatively low luminance is set to the selected color light passing through the relay optical system. In this case, the adjustment lowers the luminance of the other color lights, in order to attain the accurate reproduction of the hue of the color image. This, however, darkens the resulting image. The advantage of the above arrangement is accordingly to attain the accurate reproduction of the hue of the color image without significantly lowering the brightness of the image.

The present invention is also directed to a second projector that projects and displays a color image. The second projector includes: an illumination optical system that emits illumination light; a color light separation optical system that divides the illumination light emitted from the illumination optical system into first through third color lights, which respectively have three different color components; first through third electro-optical devices that respectively modulate the first through the third color lights, which are separated by the color light separation optical system, in response to first through third image signals and thereby generate first through third modulated lights; a color light synthesizing optical system that synthesizes the first through the third modulated lights with one another and emits synthesized light; a projection optical system that projects the synthesized light emitted from the color light synthesizing optical system; a relay optical system that is provided in one optical path selected out of three optical paths, which respectively connect the color light separation optical system with the first through the third electro-optical devices, the relay optical system regulating a size of a light bundle of a selected color light entering the corresponding electro-optical device; and an adjustment section that adjusts specific image signals, which are two out of the first through the third image signals and correspond to the electro-optical devices that receive two residual color lights not passing through the relay optical system, a degree of the adjustment being depend on pixel positions of a color image so that cross sectional luminance distributions of the first through the third modulated lights on a light-exiting side of the color light synthesizing optical system have substantially same gradients at least when the first through the third image signals reproduce a white image.

The second projector of the present invention exerts the similar functions and advantages to those of the first projector discussed above. This arrangement reduces color non-uniformity in the white image even when the light bundle of the color light passing through the relay optical system is converged and re-diverged, thus effectively reducing the color non-uniformity in the color image projected and displayed by the projector.

The present invention is further directed to a third projector that projects and displays a color image. The third projector includes: an illumination optical system that emits illumination light; a color light separation optical system that divides the illumination light emitted from the illumination optical system into first through third color lights, which respectively have three different color components; first through third electro-optical devices that respectively modulate the first through the third color lights, which are separated by the color light separation optical system, in response to first through third image signals and thereby generate first through third modulated lights; a color light synthesizing optical system that synthesizes the first through the third modulated lights with one another and emits synthesized light; a projection optical system that projects the synthesized light emitted from the color light synthesizing optical system; relay optical systems that are respectively provided in two optical paths selected out of three optical paths, which respectively connect the color light separation optical system with the first through the third electro-optical devices, each relay optical system regulating a size of a light bundle of a selected color light entering the corresponding electro-optical device; and an adjustment section that adjusts a specific image signal, which is one out of the first through the third image signals and corresponds to the electro-optical device that receives one residual color light not passing through the relay optical system, a degree of the adjustment being depend on pixel positions of a color image so that cross sectional luminance distributions of the first through the third modulated lights on a light-exiting side of the color light synthesizing optical system have substantially same gradients at least when the first through the third image signals reproduce a white image.

The third projector of the present invention exerts the similar functions and advantages to those of the first projector discussed above. This arrangement reduces color non-uniformity in the white image even when the light bundle of the color light passing through the relay optical system is converged and re-diverged, thus effectively reducing the color non-uniformity in the color image projected and displayed by the projector.

The third projector advantageously reduces the color non-uniformity by simply adjusting only one image signal corresponding to the electro-optical device that receives one color light not passing through the relay optical system.

The present invention is also directed to a fourth projector that projects and displays a color image. The fourth projector includes: an illumination optical system that emits illumination light; a color light separation optical system that divides the illumination light emitted from the illumination optical system into first through third color lights, which respectively have three different color components; first through third electro-optical devices that respectively modulate the first through the third color lights, which are separated by the color light separation optical system, in response to first through third image signals and thereby generate first through third modulated lights; a color light synthesizing optical system that synthesizes the first through the third modulated lights with one another and emits synthesized light; a projection optical system that projects the synthesized light emitted from the color light synthesizing optical system; relay optical systems that are respectively provided in two optical paths selected out of three optical paths, which respectively connect the color light separation optical system with the first through the third electro-optical devices, each relay optical system regulating a size of a light bundle of a selected color light entering the corresponding electro-optical device; and an adjustment section that adjusts specific image signals, which are two out of the first through the third image signals and correspond to the electro-optical devices that receive the two selected color lights passing through the relay optical systems, a degree of the adjustment being depend on pixel positions of a color image so that cross sectional luminance distributions of the first through the third modulated lights on a light-exiting side of the color light synthesizing optical system have substantially same gradients at least when the first through the third image signals reproduce a white image.

The fourth projector of the present invention exerts the similar functions and advantages to those of the first projector discussed above. This arrangement reduces color non-uniformity in the white image even when the light bundle of the color light passing through the relay optical system is converged and re-diverged, thus effectively reducing the color non-uniformity in the color image projected and displayed by the projector.

In any of the first through the fourth projectors discussed above, the adjustment section may carry out the adjustment according to the pixel positions of an image only when values of pixels constituting the specific image signal of interest are within a preset range of relatively high luminance.

This arrangement reduces the color non-uniformity in the projected and displayed image that is at least a practically white image, thus effectively reducing the color non-uniformity in the resulting color image projected and displayed by the projector.

In accordance with one preferable embodiment of any of the first through the fourth projectors discussed above, the illumination optical system includes: a light source; a lens array that divides a light bundle emitted from the light source into a plurality of sub-beams; and a superimposing lens that causes the plurality of sub-beams output from the lens array to be superimposed in the first through the third electro-optical devices.

The illumination optical system of such configuration does not attain the uniform cross sectional luminance distributions of the respective color lights that illuminate the corresponding electro-optical devices. Application of the present invention thus exerts the significant advantages on the projector including this illumination optical system.

These and other objects, features, aspects, and advantages of the present invention will become more apparent from the following detailed description of the preferred embodiments with the accompanying drawings.

BRIEF DESCRIPTION OF THE DRAWINGS

FIGS. 5(A-1), 5(B-1), 5(C-1), 5(A-2), 5(B-2) and 5(C-2) show respective color lights emitted from the cross dichroic prism 520 of FIG. 4;

FIGS. 7(A-1), 7(B-1), 7(C-1), 7(A-2), 7(B-2) and 7(C-2) show respective color lights emitted from the cross dichroic prism 520 when green light G has a higher luminance than those of other color lights R and B;

FIGS. 9(A-1), 9(B-1), 9(C-1), 9(A-2), 9(B-2) and 9(C-2) show respective color lights emitted from the cross dichroic prism 520 of FIG. 8;

FIGS. 11(A-1), 11(B-1), 11(C-1), 11(A-2), 11(B-2) and 11(C-2) show respective color lights emitted from the cross dichroic prism 520 of FIG. 10.

DESCRIPTION OF THE PREFERRED EMBODIMENTS

A. First Embodiment

Figure 1:
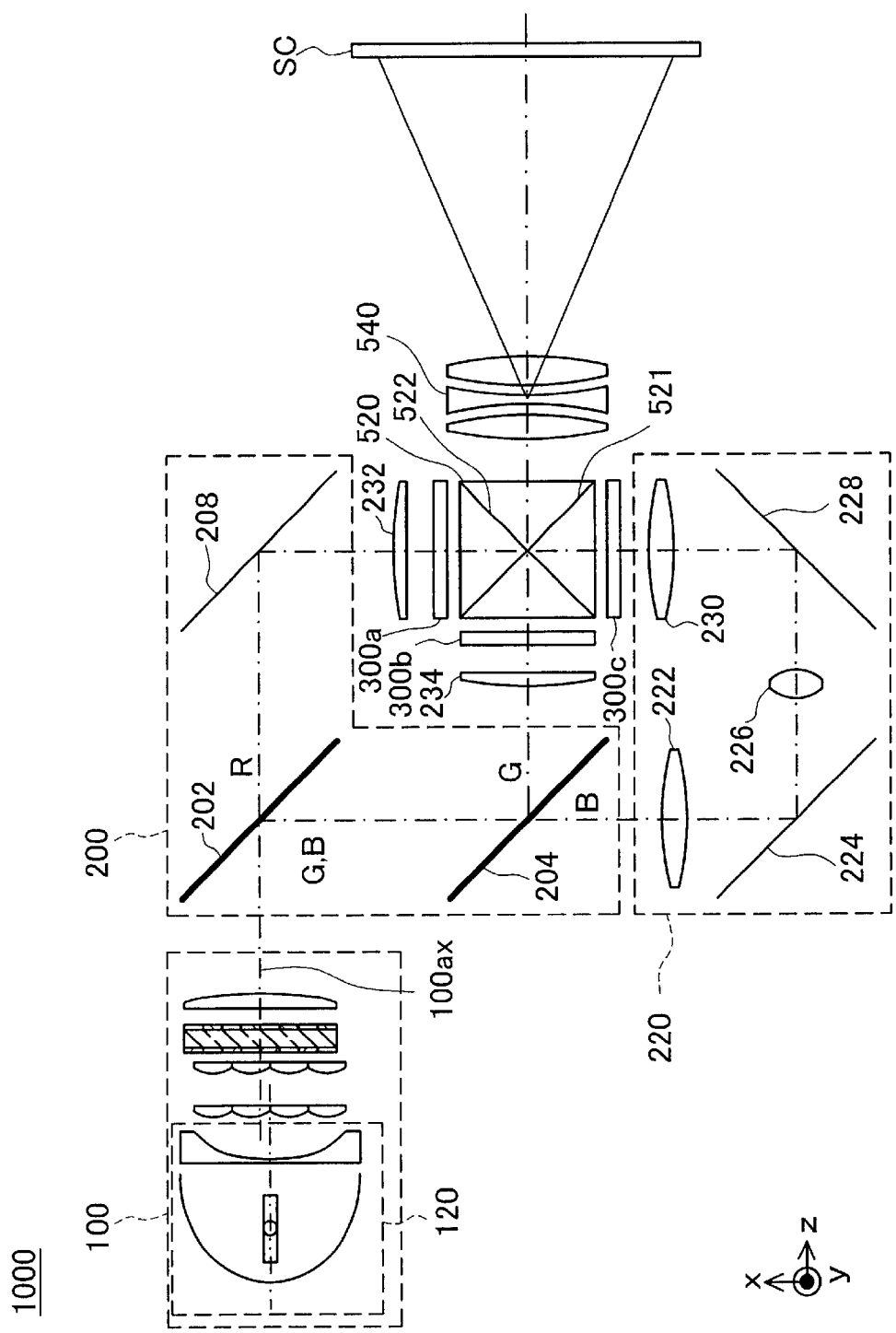
FIG. 1 schematically illustrates the structure of a projector in a first embodiment of the present invention.

FIG. 1 schematically illustrates the structure of a projector in a first embodiment of the present invention. The projector 1000 comprises an illumination optical system 100 including a light source device 120, a color light separation optical system 200, a relay optical system 220, three liquid crystal light valves 300a through 300c, a cross dichroic prism 520, and a projection lens 540.

The color light separation optical system 200 divides light emitted from the illumination optical system 100 (FIG. 1) into three color lights, red (R), green (G), and blue (B). The liquid crystal light valves 300a through 300c respectively modulate the separated color lights R, G, and B in response to image information (image signals) and generate three modulated color lights. The cross dichroic prism 520 synthesizes the three modulated color lights with one another to synthesized light. The projection lens 540 projects the synthesized light on a screen SC to display a color image.

Figure 2:
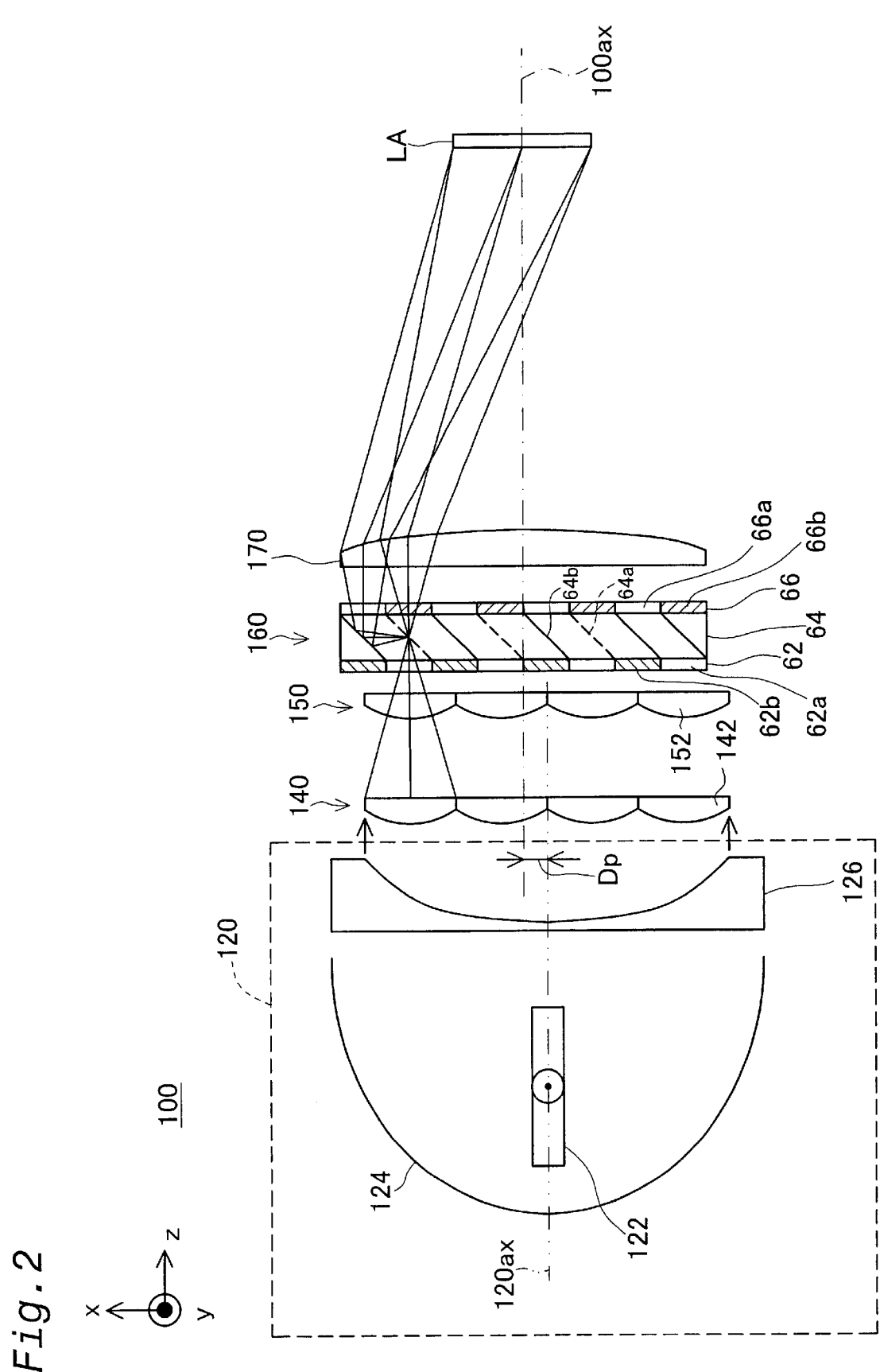
FIG. 2 is an enlarged view illustrating the details of the illumination optical system 100 of FIG. 1.

FIG. 2 is an enlarged view illustrating the details of the illumination optical system 100 of FIG. 1. The illumination optical system 100 includes the light source device 120, a first lens array 140, a second lens array 150, a polarized light generating optical system 160, and a superimposing lens 170. The light source device 120, the first lens array 140, and the second lens array 150 are arranged on the basis of a light source optical axis 120ax, whereas the polarized light generating optical system 160 and the superimposing lens 170 are arranged on the basis of a system optical axis 100ax. The light source optical axis 120ax represents the center axis of the light bundle (bundle of rays) emitted from the light source device 120. The system optical axis 100ax represents the center axis of the light bundle emitted from the optical element after the polarized light generating optical system 160, that is, the center axis of the light bundle emitted from the illumination optical system 100. As illustrated in FIG. 2, the system optical axis 100ax is substantially parallel to but is deviated from the light source optical axis 120ax by a predetermined amount of deviation Dp in a direction x. The predetermined amount of deviation Dp will be discussed later. It should be noted that an area LA to be illuminated of FIG. 2 irradiated with the illumination optical system 100 corresponds to the liquid crystal light valves 300a through 300c of FIG. 1.

The light source device 120 has the function of emitting a substantially parallel light bundle. The light source device 120 includes a lamp 122, a reflector 124 with a concave having the shape of an ellipsoid of revolution, and a paralleling lens 126. Light emitted from the lamp 122 is reflected by the reflector 124 and is then converted by the paralleling lens 126 into light that is substantially parallel to the light source optical axis 120ax. The light source device may alternatively include a reflector with a concave having the shape of a paraboloid of revolution.

The first lens array 140 has a plurality of small lenses 142 arranged in a matrix. Each small lens 142 is a planoconvex lens designed to have an outer shape, which is seen from a direction z, similar to the shape of the area LA to be illuminated (the liquid crystal light valves). The first lens array 140 divides the substantially parallel light bundle emitted from the light source device 120 into a plurality of sub-beams.

The second lens array 150 has a plurality of small lenses 152 arranged in a matrix and is same with the first lens array 140. The second lens array 150 functions to make respective center axes of the plurality of the sub-beams output from the first lens array 140 substantially parallel to the system optical axis 100ax.

As illustrated in FIG. 2, the sub-beams output from the respective small lenses 142 of the first lens array 140 are condensed at a specific position near the second lens array 150, that is, in the polarized light generating optical system 160 via the second lens array 150.

Figure 3A:
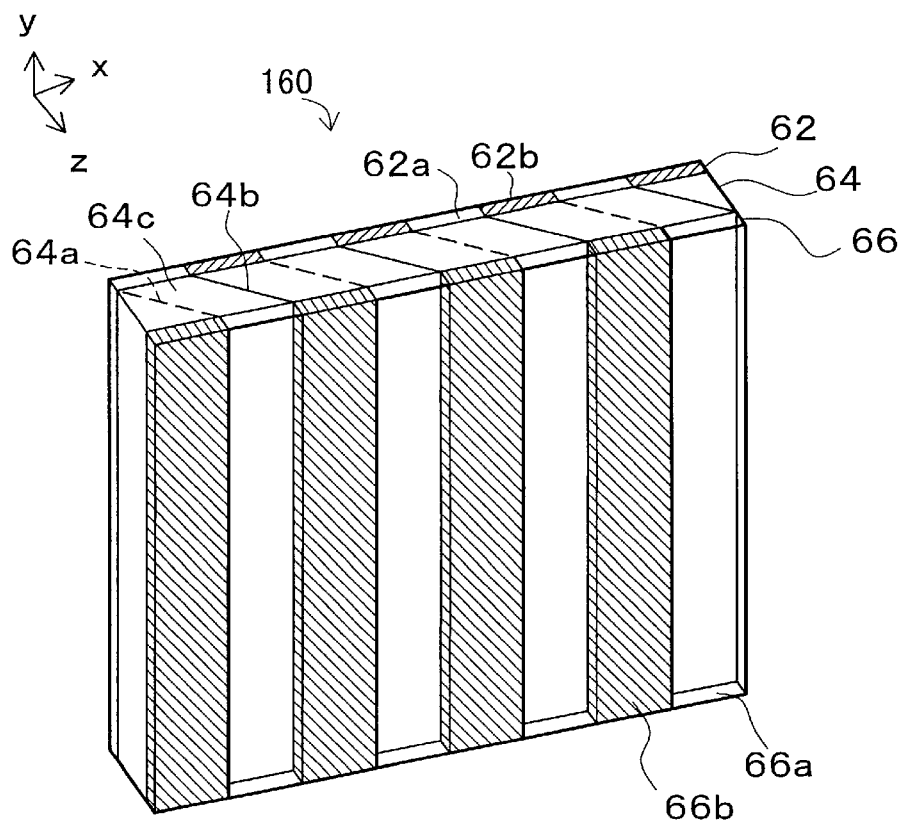
FIGS. 3(A) and 3(B) illustrate the details of the polarized light generating optical system 160 of FIG. 2.
Figure 3B:
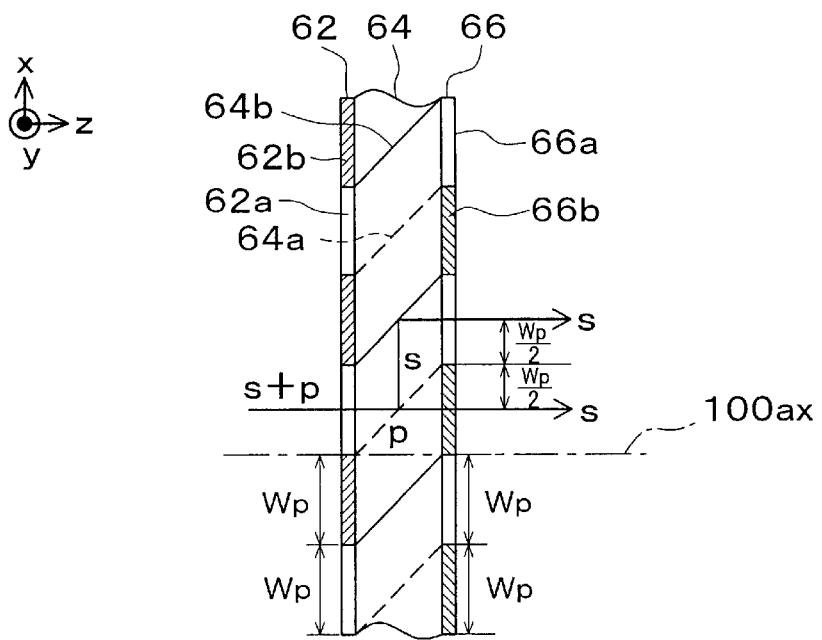

FIGS. 3(A) and 3(B) illustrate the details of the polarized light generating optical system 160. FIG. 3(A) is a perspective view of the polarized light generating optical system 160, and FIG. 3(B) is part of a plan view seen from a direction +y. The polarized light generating optical system 160 includes a light shielding plate 62, a polarization beam splitter array 64, and a selective phase plate 66.

As illustrated in FIG. 3(A), the polarization beam splitter array 64 is prepared by successively bonding a plurality of prismatic transmissive members 64c of a substantially parallelogrammatic cross section. Polarizing separation films 64a and reflecting films 64b are formed alternately on the interfaces of the transmissive members 64c. The polarizing separation films 64a are composed of a dielectric multi-layered film, and the reflecting films 64b are composed of a dielectric multi-layered film or a metal film. The transmissive members 64c are typically composed of glass.

The light shielding plate 62 has shielding sections 62b and opening sections 62a arranged in stripe. The light shielding plate 62 functions to cut off the light bundles entering the shielding sections 62b, while allowing transmission of the light bundles entering the opening sections 62a. The shielding sections 62b and the opening sections 62a are arranged to allow the sub-beams output from the first lens array 140 (FIG. 2) not to enter the reflecting films 64b but to enter only the polarizing separation films 64a of the polarization beam splitter array 64. In a concrete structure, as shown in FIG. 3(B), the respective centers of the opening sections 62a of the light shielding plate 62 are located to be practically coincident with the centers of the polarizing separation films 64a of the polarization beam splitter array 64. An opening width Wp of each opening section 62a in the direction x is set substantially equal to the dimension of the polarizing separation film 64a in the direction x. Under such conditions, the light bundles passing through the opening sections 62a of the light shielding plate 62 enter only the polarizing separation films 64a, while not entering the reflecting films 64b. The light shielding plate 62 is prepared, for example, by forming light shielding films (for example, chromium films, aluminum films, dielectric multi-layered films) on parts of a flat transmissive body (for example, a glass plate). Another example is a light shielding flat plate, such as an aluminum plate, with opening parts.

As shown by the solid line in FIG. 3(B), each sub-beam output from the first lens array 140 (FIG. 2) enters the opening section 62a of the light shielding plate 62, such that the principal ray (the center axis) of the sub-beam is substantially parallel to the system optical axis 100ax. The sub-beam passing through the opening section 62a enters the polarizing separation film 64a. The polarizing separation film 64a divides the incident sub-beam into an s-polarized sub-beam and a p-polarized sub-beam. The p-polarized sub-beam is transmitted through the polarizing separation film 64a, whereas the s-polarized sub-beam is reflected by the polarizing separation film 64a. The s-polarized sub-beam reflected from the polarizing separation film 64a goes to the reflecting film 64b and is further reflected by the reflecting film 64b. The s-polarized sub-beam reflected from the reflecting film 64b is thus made substantially parallel to the p-polarized sub-beam transmitted through the polarizing separation film 64a.

The selective phase plate 66 has opening sections 66a and $\lambda/2$ phase sections 66b. The opening sections 66a function to allow transmission of the incident linearly polarized light without any conversion. The $\lambda/2$ phase sections 66b, on the other hand, function as polarizing conversion elements that convert the incident linearly polarized light into another linearly polarized light having a perpendicular polarizing direction. In this embodiment, as shown in FIG. 3(B), the p-polarized sub-beams transmitted through the polarizing separation films 64a enter the $\lambda/2$ phase sections 66b. The $\lambda/2$ phase section 66b converts each p-polarized sub-beam into the s-polarized sub-beam and outputs the s-polarized sub-beam. The s-polarized sub-beams reflected from the reflecting films 64b, on the other hand, enter the opening sections 66a and are output without any conversion. Namely the non-polarized sub-beams entering the polarized light generating optical system 160 are converted to and output as s-polarized sub-beams. It should be noted that the exchanged arrangement between the opening sections 66a and the $\lambda/2$ phase sections 66b converts the non-polarized sub-beams entering the polarized light generating optical system 160 into p-polarized sub-beams.

As clearly understood from FIG. 3(B), the center of the two s-polarized lights output from the polarized light generating optical system 160 is deviated in the direction +x from the center of the incident non-polarized light (s-polarized light+p-polarized light). The amount of deviation is equal to half the width Wp of the $\lambda/2$ phase section 66b (that is, half the dimension of the polarizing separation film 64a in the direction x). The system optical axis 100ax is accordingly deviated from the light source optical axis 120ax by the distance Dp equal to Wp/2 as shown in FIG. 2.

The polarized light generating optical system 160 divides each of the plurality of sub-beams output from the first lens array 140 into two sub-beams, while converting the two sub-beams to a practically identical type of linearly polarized sub-beams having an identical polarizing direction. The plurality of sub-beams having the identical polarizing direction are superimposed on the area LA to be illuminated by the superimposing lens 170 shown in FIG. 2.

The illumination optical system 100 (FIG. 1) thus emits the illumination light (the s-polarized light) of a substantially identical polarizing direction. The liquid crystal light valves 300a through 300c are then irradiated with the illumination light via the color light separation optical system 200 and the relay optical system 220.

The color light separation optical system 200 includes two dichroic mirrors 202 and 204 and a reflecting mirror 208, and functions to divide the light emitted from the illumination optical system 100 into three color lights, red (R), green (G), and blue (B). The first dichroic mirror 202 allows transmission of the red light component out of the light emitted from the illumination optical system 100, while making the blue light component and the green light component reflected therefrom. The red light R transmitted through the first dichroic mirror 202 is reflected by the reflecting mirror 208, passes through a field lens 232, and enters the liquid crystal light valve 300a for red light. The field lens 232 functions to convert the respective sub-beams emitted from the illumination optical system 100 to light bundles parallel to the system optical axis 100ax. Field lenses 234 and 230 provided on the respective light-entering sides of the other liquid crystal light valves 300b and 300c have the similar functions.

The blue light component and the green light component reflected from the first dichroic mirror 202 are separated from each other by the second dichroic mirror 204. The green light G is reflected by the second dichroic mirror 204, passes through the field lens 234, and enters the liquid crystal light valve 300b for green light. The blue light B is, on the other hand, transmitted through the second dichroic mirror 204 and enters the relay optical system 220.

The blue light B entering the relay optical system 220 passes through an input-side lens 222, a first reflecting mirror 224, a relay lens 226, a second reflecting mirror 228, and an output-side lens (field lens) 230 and enters the liquid crystal light valve 300c for blue light. The relay optical system 220 is provided in the optical path of the blue light B since the optical path length of the blue light B is greater than the optical path lengths of the other color lights R and G. The relay optical system 220 enables transmission of the blue light B entering the input-side lens 222 to the output-side lens 230. The function of the relay optical system 220 carries out the adjustment to substantially equalize the sizes of the light bundles of the respective color lights entering the first through the third liquid crystal light valves 300a through 300c.

The three liquid crystal light valves 300a through 300c modulate the incident three color lights in response to given image information (image signals) and generate modulated color lights. Each of the liquid crystal light valves 300a through 300c has a liquid crystal panel and polarizers disposed on both the light-entering side and the light-exiting side.

The cross dichroic prism 520 synthesizes the three color lights (modulated color lights) modulated by the liquid crystal light valves 300a through 300c with one another and thereby generates synthesized light representing a color image. The cross dichroic prism 520 has a red light reflecting film 521 and a blue light reflecting film 522 formed in a substantially X shape on interfaces of four rectangular prisms. The red light reflecting film 521 is composed of a dielectric multi-layered film that selectively reflects red light. The blue light reflecting film 522 is composed of a dielectric multi-layered film that selectively reflects blue light. The function of the red light reflecting film 521 and the blue light reflecting film 522 synthesizes the three color lights with one another to generate the synthesized light representing the color image.

The synthesized light generated by the cross dichroic prism 520 is output towards the projection lens 540. The projection lens 540 projects the synthesized light emitted from the cross dichroic prism 520, so as to display the color image on the screen SC. A telecentric lens may be used for the projection lens 540.

As clearly understood from the above discussion, the three liquid crystal light valves 300a through 300c correspond to the first through the third electro-optical devices of the present invention. The cross dichroic prism 520 corresponds to the color light synthesizing optical system of the present invention.

Figure 4:
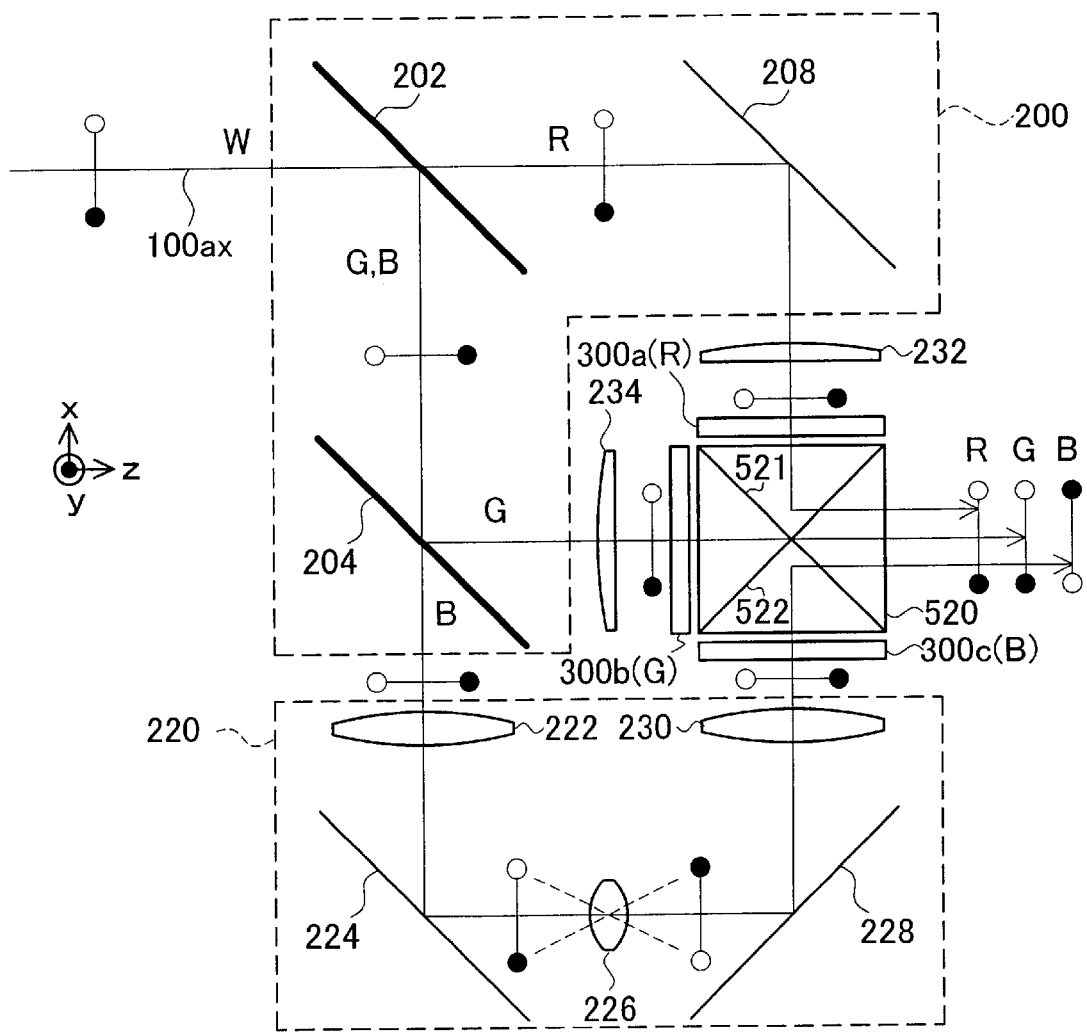
FIG. 4 shows the positional relations of light in optical paths from a color light separation optical system 200 to a cross dichroic prism 520 in the projector of FIG. 1.

FIG. 4 shows the positional relations of light in optical paths from the color light separation optical system 200 to the cross dichroic prism 520 in the projector 1000 of FIG. 1. In the drawing of FIG. 4, each pair of symbols, the open circle and the closed circle, schematically represent the positional relationship of light, which passes through various places in each optical path, in a specific direction that is perpendicular to the center axis 100ax of the light bundle and is parallel to the x-z plane. White light W before entering the color light separation optical system 200, that is, the white light W immediately after the emission from the illumination optical system 100 (FIG. 1) has the open circle facing the direction +x. The light bundle emitted from the illumination optical system 100 is a set of the plurality of sub-beams, which are superimposed on the respective liquid crystal light valves 300a through 300c.

As described above, the first dichroic mirror 202 receives the incident white light W emitted from the illumination optical system 100 and separates the red light R in the white light W from the other color lights G and B. The red light R immediately after the separation has the open circle kept to face the direction +x. The red light R after the reflection from the reflecting mirror 208 has the open circle facing the direction −z. The red light R reflected by the red light reflecting film 521 of the cross dichroic prism 520 has the open circle facing the direction +x.

The green light G and the blue light B immediately after the separation by the first dichroic mirror 202 have the open circle facing the direction −z. The second dichroic mirror 204 receives the incident green light G and the incident blue light B and separates the green light G from the blue light B. The green light G immediately after the separation has the open circle facing the direction +x. The green light G after the transmission through the two reflecting films 521 and 522 of the cross dichroic prism 520 has the open circle still facing the direction +x.

The blue light B immediately after the separation by the second dichroic mirror 204 has the open circle kept to face the direction −z. The blue light B then passes through the relay optical system 220 including the three lenses 222, 226, and 230. As explained above, the relay optical system 220 adjusts the size of the light bundle of the blue light B to be substantially same with the sizes of the light bundles of the other color lights R and G. In the course of passage through the relay optical system 220, more concretely before and after the passage through the relay lens 226, the light bundle of the blue light B is converged and re-diverged. The blue light B after the reflection from the first reflecting mirror 224 has the open circle facing the direction +x, whereas the blue light B after the passage through the relay lens 226 has the open circle facing the direction −x. Namely the positional relationship of light is inverted. The blue light B after the reflection from the second reflecting mirror 228 has the open circle facing the direction −z. The blue light B after the reflection from the blue light reflecting film 522 of the cross dichroic prism 520 has the open circle facing the direction −x.

As shown in FIG. 4, in the projector 1000 of the first embodiment, the open circles of the red light R and the green light G face the different direction from the direction of the open circle of the blue light B on the light-exiting side of the cross dichroic prism 520. Namely the positional relationship of the blue light B is reverse to those of the other color lights R and G. The drawing of FIG. 4 schematically illustrates the positional relations of light in the specific direction that is perpendicular to the center axis 100ax of the light bundle and is parallel to the x-z plane. The reverse positional relationship of the blue light B to those of the other color lights R and G is also found in another direction that is perpendicular to the center axis 100ax of the light bundle and is parallel to the direction y.

FIGS. 5(A-1), 5(B-1), 5(C-1), 5(A-2), 5(B-2) and 5(C-2) show respective color lights emitted from the cross dichroic prism 520 of FIG. 4. FIGS. 5(A-1) through 5(C-1) respectively show the positional relations of the respective color lights R, G, and B on the light-exiting side of the cross dichroic prism 520, seen from the direction +z in FIG. 4. As illustrated, the red light R and the green light G have the open circles facing the direction +x, while the blue light B has the open circle facing the direction −x. The same phenomenon occurs in the direction y. Namely the red light R and the green light G have the symbol 'open squares' facing the direction +y, while the blue light B has the open square facing the direction −y. The positional relationship of the blue light B is thus turned upside down and left-side right from the positional relationship of the red light R and the green light G.

FIGS. 5(A-2) through 5(C-2) schematically illustrate luminance distributions of the color lights shown in FIGS. 5(A-1) through 5(C-1) in the direction x as examples. These luminance distributions are on the assumption that the respective color lights are mostly transmitted through the first to the third liquid crystal light valves 300a to 300c. When the luminance on the open circle side is higher than the luminance on the closed circle side with regard to the respective color lights emitted from the illumination optical system 100 and superimposed on the liquid crystal light valves 300a through 300c, the respective color lights R, G, and B have the luminance distributions shown in FIGS.

5(A-2) through 5(C-2). As shown in FIGS. 5(A-2) through 5(C-2), the red light R and the green light G have relatively high luminance on the side +x, while the blue light B has relatively high luminance on the side −x. The luminance distributions of FIGS. 5(A-2) through 5(C-2) are on the assumption that the respective color lights R, G, and B separated by the color light separation optical system 200 have substantially equal luminances.

The illumination optical system 100 used in this embodiment is a so-called "integrator optical system" as discussed previously with FIG. 2. The light bundle emitted from the light source device 120 is divided into a plurality of sub-beams by the first lens array 140. The plurality of sub-beams are superimposed on the respective liquid crystal light valves 300a through 300c by means of the superimposing lens 170. In the integrator optical system, it is expected that the respective color lights entering the liquid crystal light valves 300a through 300c have uniform cross sectional luminance distributions. In the actual state, however, the lamp 122 of the light source device 120 is not an ideal point light source, and the first lens array 140 divides the incident light bundle into only a relatively small, finite number of sub-beams. The respective color lights superimposed on the liquid crystal light valves 300a through 300c accordingly have non-uniform cross sectional luminance distributions.

In the prior art system, the color lights R, G, and B having such non-uniform cross sectional luminance distributions are modulated by the liquid crystal light valves 300a through 300c. The resulting projected and displayed color image may thus have conspicuous color non-uniformity. In the case where the respective liquid crystal light valves transmit most of the respective incident color lights, a white image is projected and displayed on the screen SC. Color non-uniformity may be prominent in the white image.

The arrangement of this embodiment, on the other hand, adjusts some of the image signals supplied to the respective liquid crystal light valves 300a through 300c as discussed later, so as to reduce the color non-uniformity in the resulting projected and displayed color image. More specifically, when the respective color lights R, G, and B have the luminance distributions as shown in FIGS. 5(A-2) through 5(C-2), the arrangement adjusts the image signal supplied to the third liquid crystal light valve 300c, which the blue light B enters. When the image of interest to be projected and displayed is a white image, adjustment of the image signal supplied to the third liquid crystal light valve 300c causes the blue light B having the luminance distribution as shown by the broken line in FIG. 5(C-2) to be output from the third liquid crystal light valve 300c. The adjustment makes the luminance on the side +x higher than the luminance on the side −x with regard to the blue light B. The luminance distributions of the respective color lights R, G, and B accordingly have substantially same gradients. The adjustment is also carried out with regard to the luminance distributions in the direction y. This arrangement effectively reduces the color non-uniformity in the display of the white image by the projection of the respective color lights R, G, and B.

FIGS. 5(A-2) through 5(C-2) show the adjustment of the luminance distributions when projection of the respective modulated color lights displays a white image. Similar adjustment is carried out when projection of the respective modulated color lights displays an image including patterns. Namely the adjustment is performed to make the cross sectional luminance distributions of the respective modulated color lights have substantially the same gradients at least when a white image is projected and displayed.

Here the expression 'the cross sectional luminance distributions of the respective modulated color lights have substantially same gradients' means that the two-dimensional luminance distributions show similar tendencies, while the respective modulated color lights may have different luminances. Namely the cross sectional luminance distributions of the respective modulated color lights have similar shapes. The cross sectional luminance distributions of the respective modulated color lights shown in FIGS. 5(A-2) through 5(C-2) vary relatively monotonously with the maximum luminance at one end of the plane. The cross sectional luminance distributions may have different shapes with the maximum luminance in the middle of the plane or with the maximum luminance at a plurality of different positions in the plane.

Figure 6:
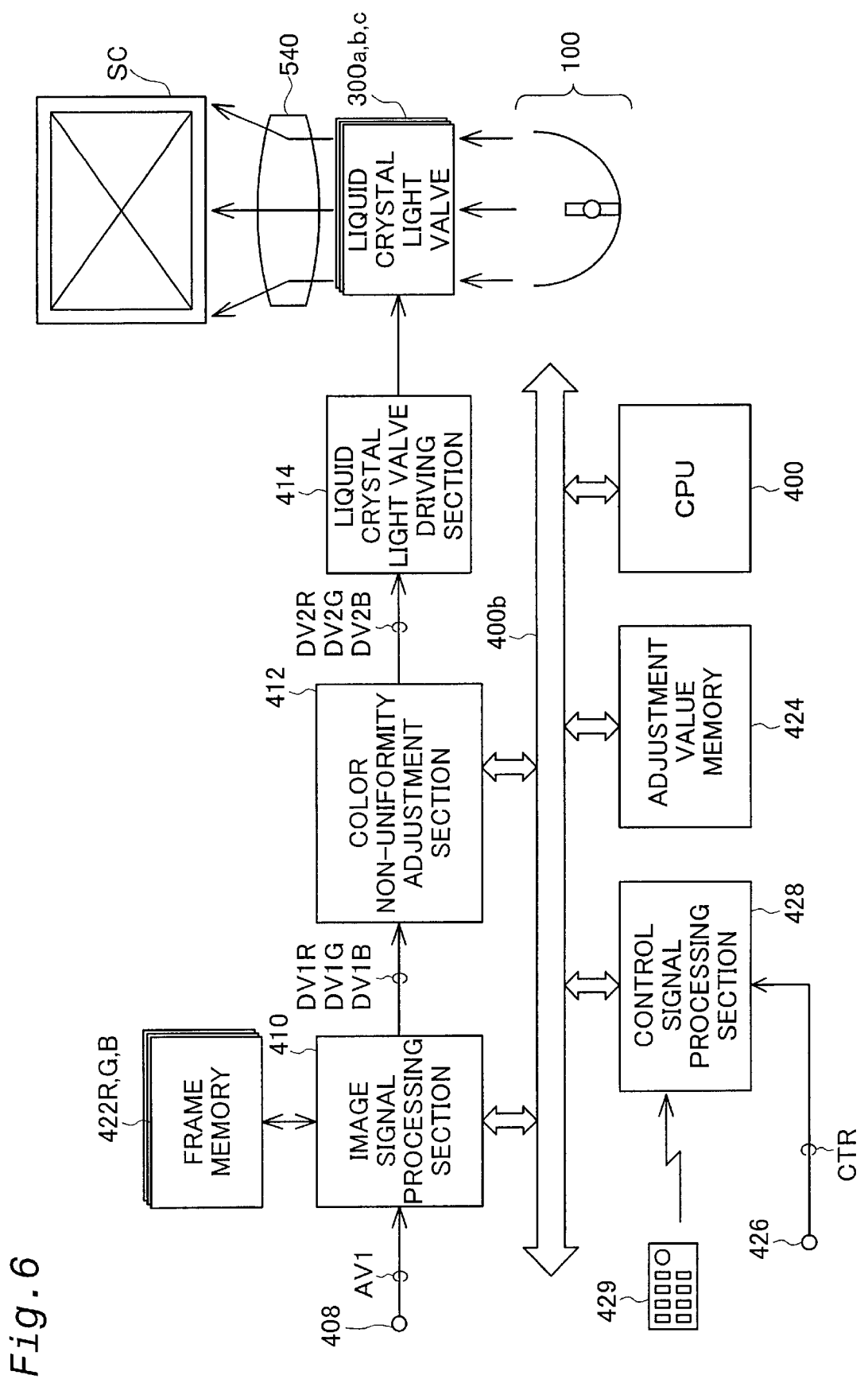
FIG. 6 illustrates the electrical configuration of the projector 1000.

FIG. 6 illustrates the electrical structure of the projector 1000. The optical system including the illumination optical system 100, the liquid crystal light valves 300a through 300c, and the projection lens 540 is simplified in the illustration of FIG. 6.

The projector 1000 includes an image signal processing section 410, three frame memories 422R, 422G, and 422B, a color non-uniformity adjustment section 412, a liquid crystal light valve driving section 414, a CPU 400, an adjustment value memory 424, and a control signal processing section 428. The image signal processing section 410, the color non-uniformity adjustment section 412, the adjustment value memory 424, the control signal processing section 428, and the CPU 400 are mutually connected via a bus 400b. The liquid crystal light valves 300a through 300c are irradiated by the illumination optical system 100, and the projection lens 540 projects the composite light of the respective color lights modulated by the liquid crystal light valves 300a through 300c and thereby displays the resulting color image on the screen SC.

An image input terminal 408 receives analog image signals AV1 output from an external image supply apparatus (not shown). The analog image signals AV1 include, for example, RGB signals output from a personal computer to represent computer images and composite image signals output from a video recorder or a television receiver to represent moving pictures.

The image signal processing section 410 carries out analog-to-digital conversion of the given analog image signals AV1. The A–D converted image data include color image data of the respective colors R, G, and B. The image signal processing section 410 also has the function of writing the A–D converted three color image data respectively into the frame memories 422R, 422G, and 422B, as well as the function of reading the three color image data from the frame memories 422R, 422G, and 422B. The image signal processing section 410 supplies three color image data DV1R, DV1G, and DV1B read from the frame memories 422R, 422G, and 422B to the color non-uniformity adjustment section 412.

The color non-uniformity adjustment section 412 functions to adjust the color image data DV1R, DV1G, and DV1B supplied from the image signal processing section 410. The adjustment is carried out with adjustment values stored in advance in the adjustment value memory 424. The adjustment values in the adjustment value memory 424 are given to the color non-uniformity adjustment section 412, while the color image data DV1R, DV1G, and DV1B are supplied to the color non-uniformity adjustment section 412. The image signal processing section 410 reads the adjustment values from the adjustment value memory 424. In accordance with a concrete procedure, the image signal processing section 410 transmits a reading control signal to the adjustment value memory 424, in order to read an adjustment value corresponding to each pixel data from the adjustment value memory 424, while reading the pixel data constituting the three color image data DV1R, DV1G, and DV1B from the frame memories 422R, 422G, and 422B. The adjustment values read from the adjustment value memory 424 are sent to the color non-uniformity adjustment section 412 via the bus 400b.

The color non-uniformity adjustment section 412 adjusts (computes) each pixel data constituting each of the color image data DV1R, DV1G, and DV1B with the adjustment value by means of an internal computing unit (not shown). In this embodiment, as discussed above with FIGS. 5(A-1) through 5(C-2), the object of adjustment is only the image signal supplied to the third liquid crystal light valve 300c (FIG. 4), which the blue light B enters. Only the blue image data DV1B is thus selected among the three color image data DV1R, DV1G, and DV1B for adjustment.

In this embodiment, the adjustment values stored in the adjustment value memory 424 are specified according to observed values of the cross sectional luminance distributions of the respective color lights, with which the respective liquid crystal light valves 300a through 300c are irradiated. The adjustment values may be prepared individually for the respective pixel data constituting the color image data DV1R, DV1G, and DV1B. The adjustment values may alternatively be prepared for each of plural areas constituting the image reproduced by the respective color image data DV1R, DV1G, and DV1B. Different values should be set for the adjustment values according to pixel positions in the image. For example, positive values of not greater than 1 are set to the adjustment values. The color non-uniformity adjustment section 412 multiplies the pixel values of the respective pixel data constituting each of the color image data DV1R, DV1G, and DV1B by the adjustment values and thereby generates adjusted color image data DV2R, DV2G, and DV2B. Even when the input pixel data have an identical pixel value, the color non-uniformity adjustment section 412 outputs adjusted pixel data having different pixel values according to the pixel positions in the image.

There is rather conspicuous color non-uniformity in the color image, due to the presence of the relay optical system 220, when the pixel values are in a relatively high tone range, that is, when the liquid crystal light valve transmits a greater part of the color light. The color non-uniformity due to the presence of the relay optical system 220 is, however, inconspicuous in the color image when the pixel values are in an intermediate tone range, that is, when the liquid crystal light valve transmits only a small part of the color light. In the latter case, the color non-uniformity due to the viewing angle property of the liquid crystal is more conspicuous than the color non-uniformity due to the presence of the relay optical system. The color non-uniformity adjustment section 412 of this embodiment thus carries out the adjustment according to the pixel positions in the image only when the respective pixel values of the input color image data DV1R, DV1G, and DV1B are within a preset range of relatively high luminance. When the maximum luminance is given at the highest value of a dynamic range of pixel values, the value within the preset range of relatively high luminance means values of not less than about 90% of the dynamic range (not less than about 230 in the case of 256 tones). This arrangement reduces the color non-uniformity in the projected and displayed image that is at least a practically white image, thus effectively reducing the color non-uniformity in the resulting color image projected and displayed by the projector. Here the practically white image means a displayed image when the respective pixels of the three color image data have values within the preset range of relatively high luminance.

In the structure of this embodiment, the color non-uniformity adjustment section 412 carries out the adjustment according to the pixel positions in the image only when the respective pixel values of the color image data are within the predetermined range. One modified arrangement may carry out the adjustment according to the pixel positions in the image, irrespective of the pixel values. The color non-uniformity adjustment section 412 should carry out the adjustment, so that the cross sectional luminance distributions of the three modulated color lights on the light-exiting side of the cross dichroic prism 520 have substantially same gradients, at least when the image reproduced by the three image signals is a white image.

The three adjusted color image data DV2R, DV2G, and DV2 output from the color non-uniformity adjustment section 412 are transmitted to the liquid crystal light valve driving section 414. The liquid crystal light valve driving section 414 actuates the liquid crystal light valves 300a through 300c in response to the adjusted color image data DV2R, DV2G, and DV2B.

The control signal processing section 428 (FIG. 6) controls the functions of the respective constituents of the projector 1000 in response to control signals CTR given from an external computer (not shown) via a signal input-output section 426. For example, the control signal processing section 428 may change the adjustment values stored in the adjustment value memory 424 in response to the control signal CTR from the external computer. The adjustment is readily carried out for a diversity of illumination optical systems 100 that emit the light bundle having non-uniform cross sectional luminance distribution, by simply changing the adjustment values. The control signal processing section 428 may also control the functions of the respective constituents of the projector 1000 in response to operation signals given from a remote control 429.

As described above, the projector 1000 of this embodiment has the color non-uniformity adjustment section 412 that reduces the color non-uniformity in the color image, due to the presence of the relay optical system 220. The color non-uniformity adjustment section 412 adjusts the blue image data DV1B, which is selected out of the three color image data DV1R, DV1G, and DV1B, according to the pixel positions in the image and thereby generates the adjusted color image data DV2R, DV2G, and DV2B. In accordance with a concrete procedure, when the image to be projected and displayed is a white image, the color non-uniformity adjustment section 412 adjusts the blue image data DV1B to cause the third liquid crystal light valve 300c (FIG. 4) to emit the color light having the cross sectional luminance distribution as shown by the broken line in FIG. 5(C-3). At least when the color image reproduced by the three color image data DV1R, DV1G, and DV1B is a white image, this adjustment enables the cross sectional luminance distributions of the respective modulated color lights, which are output from the liquid crystal light valves 300a through 300c, on the light-exiting side of the cross dichroic prism 520 to have substantially same gradients. This effectively reduces the color non-uniformity in the resulting color image.

As clearly understood from the above discussion, the color non-uniformity adjustment section 412 and the adjustment value memory 424 of this embodiment correspond to the adjustment section of the present invention.

B. Second Embodiment

FIGS. 5(A-1) through 5(C-2) regard the case where the respective color lights separated by the color light separation optical system 200 have substantially equal luminances. In the actual state, however, the green light G may have a higher luminance. This is because the light emitted from a high-pressure mercury lamp or a metal halide lamp, which is typically used for the lamp 122 of the light source device 120, includes a relatively large portion of the green light component.

FIGS. 7(A-1), 7(B-1), 7(C-1), 7(A-2), 7(B-2) and 7(C-2) show respective color lights emitted from the cross dichroic prism 520 when green light G has a higher luminance than those of other color lights R and B. FIGS. 7(A-1) through 7(C-2) are similar to FIGS. 5(A-1) through 5(C-2), except FIG. 7(B-2).

The comparison between FIGS. 7(A-2) through 7(C-2) and FIGS. 5(A-2) through 5(C-2) shows that the luminance of the green light G is higher than the luminances of the other color lights R and B in the case of FIGS. 7(A-2) through 7(C-2). In this case, adjustment of the luminance distribution of the blue light B as shown in FIG. 7(C-2) reduces the luminance of the blue light B to be lower than the luminances of the other color lights R and G. Such adjustment reduces the color non-uniformity in the projected and displayed color image, but the displayed image is rather greenish and does not accurately reproduce the hue, because of the higher luminance of the green light G than the luminances of the other color lights R and B. When the luminance of the blue light B is lower than the luminances of the other color lights R and G, above phenomenon caused by the adjustment of the luminance distribution is more significant. One possible measure against such phenomenon reduces the luminances of the red light R and the green light G to be equivalent to the luminance of the blue light B. This enables accurate reproduction of the hue, but undesirably darkens the projected and displayed color image. A second embodiment of the present invention accordingly regards an arrangement that enables accurate reproduction of the hue of the projected and displayed color image without significantly lowering the brightness of the image under the above conditions.

Figure 8:
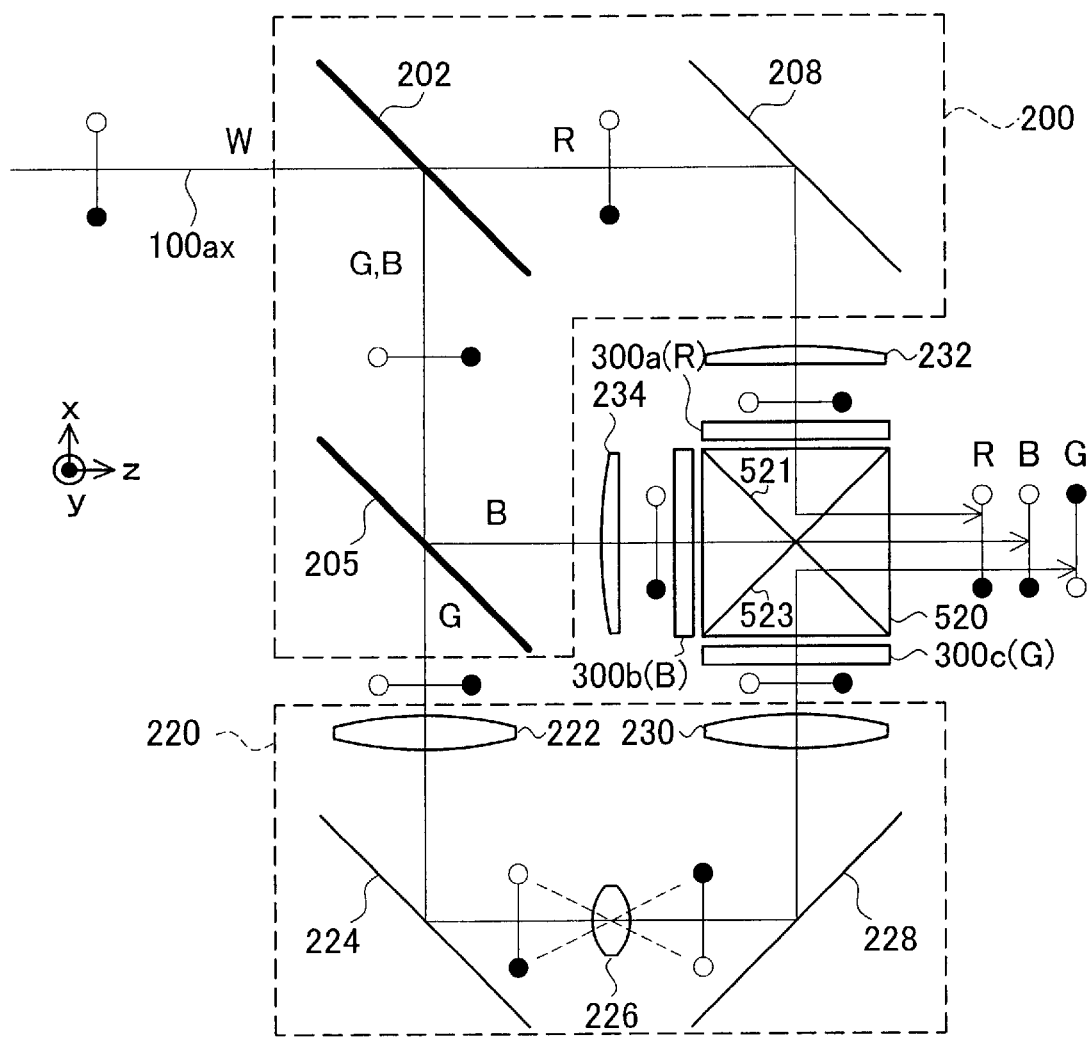
FIG. 8 shows a main part of another projector in a second embodiment.

FIG. 8 shows a main part of a projector in the second embodiment. In the projector of the second embodiment, the second dichroic mirror 204 included in the color light separation optical system 200 shown in FIG. 4 is replaced by a dichroic mirror 205 that makes the blue light B reflected therefrom, while allowing transmission of the green light G. The second reflecting film 522 formed in the cross dichroic prism 520 shown in FIG. 4 is replaced by a green light reflecting film 523 that selectively reflects the green light G. Image signals supplied to the second and the third liquid crystal light valves 300b and 300c are exchanged with such replacement.

In the arrangement of the second embodiment, the optical path of the blue light B and the optical path of the green light G are exchanged. The symbol 'open circle' of the green light G accordingly faces the different direction from the direction of the other color lights R and B on the light-exiting side of the cross dichroic prism 520. Namely the positional relationship of the green light G is reverse to the positional relationship of the other color lights R and B.

FIGS. 9(A-1), 9(B-1), 9(C-1), 9(A-2), 9(B-2) and 9(C-2) show respective color lights emitted from the cross dichroic prism 520 of FIG. 8 and correspond to FIGS. 5(A-1), 5(B-1), 5(C-1), 5(A-2), 5(B-2) and 5(C-2). As shown in FIGS. 9(A-1) through 9(C-1), the red light R and the blue light B have the open circles facing the direction +x, while the green light G has the open circle facing the direction −x. The same phenomenon occurs in the direction y. Namely the red light R and the blue light B have the symbol 'open squares' facing the direction +y, while the green light G has the open square facing the direction −y. The positional relationship of the green light G is thus turned upside down and left-side right from the positional relationship of the red light R and the blue light B.

FIGS. 9(A-2) through 9(C-2) schematically illustrate luminance distributions of the color lights shown in FIGS. 9(A-1) through 9(C-1) in the direction x as examples. As illustrated, the red light R and the blue light B have relatively high luminance on the side +x, while the green light G has relatively high luminance on the side −x. The luminance of the green light G is higher than the luminances of the other color lights R and B.

In the arrangement of this embodiment, the color non-uniformity adjustment section 412 (see FIG. 6) adjusts the green image data DV1G, which is selected out of the three color image data DV1R, DV1G, and DV1B representing the color image of interest to be projected and displayed, according to the pixel positions in the image and thereby generates the adjusted color image data DV2R, DV2G, and DV2B. In accordance with a concrete procedure, when the image to be projected and displayed is a white image, the color non-uniformity adjustment section 412 adjusts the green image data DV1G to cause the third liquid crystal light valve 300c (FIG. 8) to emit the color light having the cross sectional luminance distribution as shown by the broken line in FIG. 9(C-2). At least when the color image reproduced by the three color image data DV1R, DV1G, and DV1B is a white image, this adjustment enables the cross sectional luminance distributions of the respective modulated color lights, which are output from the liquid crystal light valves 300a through 300c, on the light-exiting side of the cross dichroic prism 520 to have substantially same gradients. This effectively reduces the color non-uniformity in the resulting color image.

As shown in FIGS. 8 and 9(A-1) through 9(C-2), in the arrangement of the second embodiment, the green light G having the highest luminance among the three color lights is set to the color light passing through the relay optical system 220. The other color lights R and B are set to the color light not passing through the relay optical system 220. The cross sectional luminance distribution of the green light G having the highest luminance is turned upside down and left-side right from the cross sectional luminance distributions of the other color lights R and B. This arrangement thus requires adjustment of only the green image data DV1G corresponding to the third liquid crystal light valve 300c, which the green light G having the highest luminance enters. In the process of projecting and displaying a white image, the luminances of the respective modulated color lights are adjusted to substantially equal levels as shown in FIGS. 9(A-2) through 9(C-2). This ensures the accurate reproduction of the hue of the color image.

C. Third Embodiment

Figure 10:
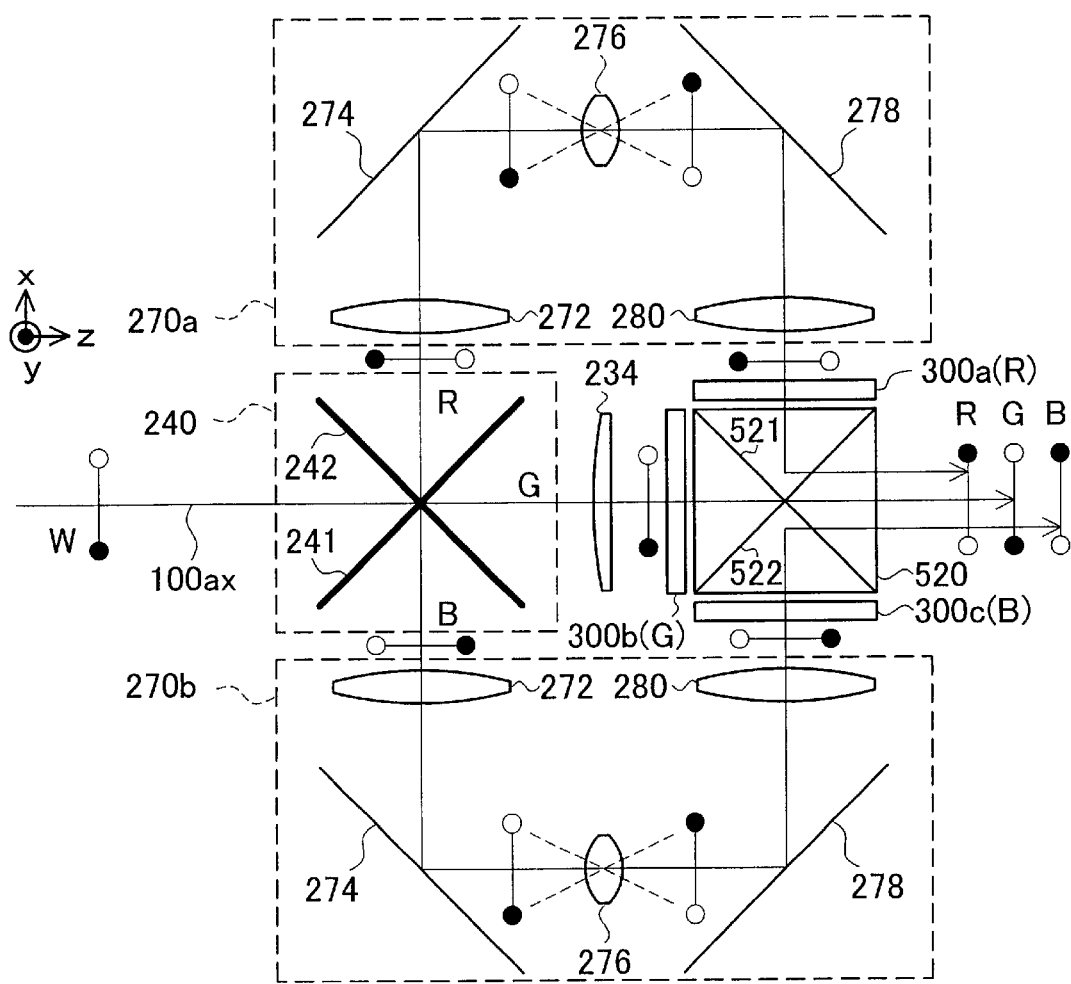
FIG. 10 shows a main part of still another projector in a third embodiment.

FIG. 10 illustrates a main part of another projector in a third embodiment. In both the first and the second embodiments, the relay optical system 220 is provided in one optical path out of the three optical paths. In the arrangement of the third embodiment, however, relay optical systems are provided in two optical paths out of the three optical paths. The projector of the third embodiment thus includes a color light separation optical system 240 and two relay optical systems 270a and 270b.

The color light separation optical system 240 includes a first dichroic mirror 241 that selectively reflects red light and a second dichroic mirror 242 that selectively reflects blue light. The first dichroic mirror 241 and the second dichroic mirror 242 are arranged in a substantially X shape.

Each of the two relay optical systems 270a and 270b has an input-side lens 272, a relay lens 276, an output-side lens (field lens) 280, and two reflecting mirrors 274 and 278.

The white light W emitted from the illumination optical system 100 is divided into three color lights R, G, and B by the color light separation optical system 240. The separated red and blue lights R and B respectively pass through the relay optical systems 270a and 270b and enter the first and the third liquid crystal light valves 300a and 300c. The separated green light G, on the other hand, passes through only the field lens 234 and enters the second liquid crystal light valve 300b. As shown in FIG. 10, the light bundles of the red and blue lights R and B are converged and re-diverged in the relay optical systems 270a and 270b. The symbol 'open circle' of the green light G accordingly faces the different direction from the direction of the other color lights R and B on the light-exiting side of the cross dichroic prism 520. Namely the positional relationship of the green light G is reverse to the positional relationship of the other color lights R and B.

FIGS. 11(A-1), 11(B-1), 11(C-1), 11(A-2), 11(B-2) and 11(C-2) show respective color lights emitted from the cross dichroic prism 520 of FIG. 10 and correspond to FIGS. 5(A-1), 5(B-1), 5(C-1), 5(A-2), 5(B-2) and 5(C-2). As shown in FIGS. 11(A-1) through 11(C-1), the red light R and the blue light B have the open circles facing the direction −x, while the green light G has the open circle facing the direction +x. The same phenomenon occurs in the direction y. Namely the red light R and the blue light B have the symbol 'open squares' facing the direction −y, while the green light G has the open square facing the direction +y. The positional relationship of the green light G is thus turned upside down and left-side right from the positional relationship of the red light R and the blue light B.

FIGS. 11(A-2) through 11(C-2) schematically illustrate luminance distributions of the color lights shown in FIGS. 11(A-1) through 11(C-1) in the direction x as examples. As illustrated, the red light R and the blue light B have relatively high luminance on the side −x, while the green light G has relatively high luminance on the side +x. Like the second embodiment, the luminance of the green light G is higher than the luminances of the other color lights R and B.

In the arrangement of this embodiment, the color non-uniformity adjustment section 412 (see FIG. 6) adjusts the green image data DV1G, which is selected out of the three color image data DV1R, DV1G, and DV1B representing the color image of interest to be projected and displayed, according to the pixel positions in the image and thereby generates the adjusted color image data DV2R, DV2G, and DV2B. In accordance with a concrete procedure, when the image to be projected and displayed is a white image, the color non-uniformity adjustment section 412 adjusts the green image data DV1G to cause the second liquid crystal light valve 300b (FIG. 10) to emit the color light having the cross sectional luminance distribution as shown by the broken line in FIG. 11(B-2). At least when the color image reproduced by the three color image data DV1R, DV1G, and DV1B is a white image, this adjustment enables the cross sectional luminance distributions of the respective modulated color lights, which are output from the liquid crystal light valves 300a through 300c, on the light-exiting side of the cross dichroic prism 520 to have substantially same gradients. This effectively reduces the color non-uniformity in the resulting color image.

As shown in FIGS. 10 and 11(A-1) through 11(C-2), in the arrangement of the third embodiment, the green light G having the highest luminance among the three color lights is set to the color light not passing through the relay optical system 270a or 270b. The other color lights R and B are set to the color light passing through the relay optical systems 270a and 270b. The cross sectional luminance distribution of the green light G having the highest luminance is turned upside down and left-side right from the cross sectional luminance distributions of the other color lights R and B. This arrangement thus requires adjustment of only the green image data DV1G corresponding to the second liquid crystal light valve 300b, which the green light G having the highest luminance enters. In the process of projecting and displaying a white image, the luminances of the respective modulated color lights are adjusted to substantially equal levels as shown in FIGS. 11(A-2) through 11(C-2). This ensures the accurate reproduction of the hue of the color image.

The embodiments and their modifications discussed above are to be considered in all aspects as illustrative and not restrictive. There may be many other modifications, changes, and alterations without departing from the scope or spirit of the main characteristics of the present invention. All changes within the meaning and range of equivalency of the claims are therefore intended to be embraced therein. Some examples of possible modification are discussed below.

(1) In the first through the third embodiments discussed above, the color non-uniformity adjustment section 412 (FIG. 6) receives all the three color image data DV1R, DV1G, and DV1B. The color non-uniformity adjustment section 412 carries out the adjustment only for selected one color image data, while outputting the other color image data without any adjustment. In accordance with one modified structure, the color image data that do not require the adjustment may not be given to the color non-uniformity adjustment section 412 but may be directly given to the liquid crystal light valve driving section 414.

In the first through the third embodiments discussed above, the color non-uniformity adjustment section 412 carries out the adjustment to reduce the color non-uniformity due to the presence of the relay optical system, only when the pixel values are within the preset range of relatively high luminance. The adjustment may also be carried out when the pixel values are in an intermediate tone range. In the case of the pixel values in the intermediate tone range, intermediate tone correction based on, for example, the gamma property may alternatively be performed. In the latter case, the color non-uniformity adjustment section 412 receives all the three color image data DV1R, DV1G, and DV1B and carries out the intermediate tone correction by means of an intermediate tone correction section included in the color non-uniformity adjustment section 412.

(2) In the arrangement of the first embodiment, the color non-uniformity adjustment section 412 adjusts the blue image data DV1B that is selected among the three color image data DV1R, DV1G, and DV1B and corresponds to the third liquid crystal light valve 300c, which the blue light B passing through the relay optical system 220 enters. The color non-uniformity adjustment section 412 may alternatively select and adjust the red image data DV1R and the green image data DV1G corresponding to the first liquid crystal light valve 300a and the second liquid crystal light valve 300b, which the red light R and the green light G not passing through the relay optical system 220 enters.

In the arrangement of the second embodiment, the color non-uniformity adjustment section 412 adjusts the green image data DV1G that is selected among the three color image data DV1R, DV1G, and DV1B and corresponds to the third liquid crystal light valve 300c, which the green light G passing through the relay optical system 220 enters. The color non-uniformity adjustment section 412 may alternatively select and adjust the red image data DV1R and the blue image data DV1B corresponding to the first liquid crystal light valve 300a and the second liquid crystal light valve 300b, which the red light R and the blue light B not passing through the relay optical system 220 enters.

In the arrangement of the third embodiment, the color non-uniformity adjustment section 412 adjusts the green image data DV1G that is selected among the three color image data DV1R, DV1G, and DV1B and corresponds to the second liquid crystal light valve 300b, to which the green light G not passing through the relay optical system 270a and 270b enters. The color non-uniformity adjustment section 412 may alternatively select and adjust the red image data DV1R and the blue image data DV1B corresponding to the first liquid crystal light valve 300a and the third liquid crystal light valve 300c, to which the red light R and the blue light B passing through the relay optical system 270a and 270b enters.

As discussed above, in all of the first through the third embodiments, the color non-uniformity adjustment section 412 (FIG. 6) adjusts only one color image data selected out of the three color image data DV1R, DV1G, and DV1B. Modified arrangement may adjust selected two color image data or all the three color image data. Namely the adjustment section should adjust at least one image signal, which is selected out of the first through the third image signals representing the color image of interest to be projected and displayed, according to the pixel positions in the image. In general, the adjustment should be carried out with regard to the image signal corresponding to the liquid crystal light valve, to which either the color light passing through the relay optical system or the color light not passing through the relay optical system enters.

(3) In the arrangement of the second embodiment, the color non-uniformity adjustment section 412 adjusts the green image data DV1G that is selected among the three color image data DV1R, DV1G, and DV1B and corresponds to the third liquid crystal light valve 300c, to which the green light G having a higher luminance among the three color lights enters (see FIGS. 9(A-1) through 9(C-2)). In the arrangement of the third embodiment, the color non-uniformity adjustment section 412 adjusts the green image data DV1G that is selected among the three color image data DV1R, DV1G, and DV1B and corresponds to the second liquid crystal light valve 300b, to which the green light G having a higher luminance among the three color lights enters (see FIGS. 11(A-1) through 11(C-2)).

In the arrangement of the first embodiment, as shown in FIGS. 5(A-1) through 5(C-2), the three color lights have substantially equal luminances. In the case where the color lights R and G have relatively high luminance, the preferable arrangement selects and adjusts the color image data DV1R and DV1G corresponding to the first liquid crystal light valve 300a and the second liquid crystal light valve 300b, to which the red light R and the green light G enter.

As described above, it is preferable that the adjustment section of the present invention adjusts the image signal that is selected out of the first through the third image signals and corresponds to the electro-optical device, which the color light having a higher luminance among the first through the third color lights enters. In the case of projecting and displaying a white image, as shown in FIGS. 9(A-2) through 9(C-2) and FIGS. 11(A-2) through 11(C-2), this arrangement substantially equalizes the luminances of the respective color lights, thus ensuring accurate reproduction of the hue of the color image.

(4) In the first through the third embodiments discussed above, the arrangement adjusts the image signals supplied to the first through the third liquid crystal light valves, so as to electrically reduce the color non-uniformity in the color image, due to the presence of the relay optical system. One possible modification may optically reduce the color non-uniformity in the color image. An optical attenuation filter may be disposed on the light-entering side or the light-exiting side of the liquid crystal light valve to reduce the color non-uniformity in the color image. For example, in the structure of the first embodiment, the optical attenuation filter may be located on the light-entering side of the third liquid crystal light valve 300c. This adjustment section (the optical attenuation filter) also carries out the adjustment, so that the cross sectional luminance distributions of the respective modulated color lights emitted from the liquid crystal light valves have substantially same gradients in the case of projecting and displaying a white image.

It is, however, relatively difficult to prepare the optical attenuation filter according to the cross sectional luminance distribution of the color light that enters the liquid crystal light valve. As discussed in the first through the third embodiments, it is accordingly preferable that the adjustment section adjusts at least one image signal, which is selected out of the first through the third image signals representing the color image of interest to be projected and displayed, according to the pixel positions in the image. The adjustment is carried out to cause the cross sectional luminance distributions of the first through the third modulated lights on the light-exiting side of the color light synthesizing optical system to have substantially same gradients, at least when the first through the third image signals reproduce a white image.

(5) The above embodiments regard application of the present invention to the transmissive-type projector. The principle of the present invention is also applicable to a reflective-type projector. In the 'transmissive-type' projector, the electro-optical devices working as the light modulation means allow transmission of light; for example, transmissive-type liquid crystal panels. In the 'reflective-type' projector, on the other hand, the electro-optical devices working as the light modulation means reflect light; for example, reflective-type liquid crystal panels. Application of the present invention to the reflective-type projector ensures the similar advantages to those attained by application to the transmissive-type projector.

(6) In the above embodiments, part of the hardware structure may be replaced by software, while part of the software may be replaced by hardware structure.

The scope and spirit of the present invention are indicated by the appended claims, rather than by the foregoing description.

What is claimed is:

1. A projector that projects and displays a color image, the projector comprising:
   an illumination optical system that emits illumination light;
   a color light separation optical system that divides the illumination light emitted from the illumination optical system into first through third color lights, which respectively have three different color components;
   first through third electro-optical devices that respectively modulate the first through the third color lights, which are separated by the color light separation optical system, in response to first through third image signals and thereby generate first through third modulated lights;
   a color light synthesizing optical system that synthesizes the first through the third modulated lights with one another and emits synthesized light;
   a projection optical system that projects the synthesized light emitted from the color light synthesizing optical system;
   a relay optical system that is provided in one optical path selected out of three optical paths, which respectively connect the color light separation optical system with the first through the third electro-optical devices, the relay optical system regulating a size of a light bundle of a selected color light; and
   an adjustment section that adjusts a specific image signal, which is one out of the first through the third image signals and corresponds to the electro-optical device that receives the selected color light passing through the relay optical system, a degree of the adjustment being depend on pixel positions of a color image so that cross sectional luminance distributions of the first through the third modulated lights on a light-exiting side of the color light synthesizing optical system have substantially same gradients at least when the first through the third image signals reproduce a white image.

2. The projector in accordance with claim 1, wherein the selected color light passing through the relay optical system is a color light having the highest luminance among the first through the third color lights.

3. The projector in accordance with claim 1, wherein the adjustment section carries out the adjustment according to the pixel positions of an image only when values of pixels constituting the specific image signal of interest are within a preset range of relatively high luminance.

4. The projector in accordance with claim 1, wherein the illumination optical system comprises:
   a light source;
   a lens array that divides a light bundle emitted from the light source into a plurality of sub-beams; and
   a superimposing lens that causes the plurality of sub-beams output from the lens array to be superimposed in the first through the third electro-optical devices.

5. A projector that projects and displays a color image, the projector comprising:
   an illumination optical system that emits illumination light;
   a color light separation optical system that divides the illumination light emitted from the illumination optical system into first through third color lights, which respectively have three different color components;
   first through third electro-optical devices that respectively modulate the first through the third color lights, which are separated by the color light separation optical system, in response to first through third image signals and thereby generate first through third modulated lights;
   a color light synthesizing optical system that synthesizes the first through the third modulated lights with one another and emits synthesized light;
   a projection optical system that projects the synthesized light emitted from the color light synthesizing optical system;
   a relay optical system that is provided in one optical path selected out of three optical paths, which respectively connect the color light separation optical system with the first through the third electro-optical devices, the relay optical system regulating a size of a light bundle of a selected color light; and
   an adjustment section that adjusts specific image signals, which are two out of the first through the third image signals and correspond to the electro-optical devices that receive two residual color lights not passing through the relay optical system, a degree of the adjustment being depend on pixel positions of a color image so that cross sectional luminance distributions of the first through the third modulated lights on a light-exiting side of the color light synthesizing optical system have substantially same gradients at least when the first through the third image signals reproduce a white image.

6. The projector in accordance with claim 5, wherein the adjustment section carries out the adjustment according to the pixel positions of an image only when values of pixels constituting the specific image signal of interest are within a preset range of relatively high luminance.

7. The projector in accordance with claim 5, wherein the illumination optical system comprises:
   a light source;
   a lens array that divides a light bundle emitted from the light source into a plurality of sub-beams; and
   a superimposing lens that causes the plurality of sub-beams output from the lens array to be superimposed in the first through the third electro-optical devices.

8. A projector that projects and displays a color image, the projector comprising:
   an illumination optical system that emits illumination light;
   a color light separation optical system that divides the illumination light emitted from the illumination optical system into first through third color lights, which respectively have three different color components;
   first through third electro-optical devices that respectively modulate the first through the third color lights, which are separated by the color light separation optical system, in response to first through third image signals and thereby generate first through third modulated lights;
   a color light synthesizing optical system that synthesizes the first through the third modulated lights with one another and emits synthesized light;
   a projection optical system that projects the synthesized light emitted from the color light synthesizing optical system;
   relay optical systems that are respectively provided in two optical paths selected out of three optical paths, which respectively connect the color light separation optical system with the first through the third electro-optical devices, each relay optical system regulating a size of a light bundle of a selected color light; and an adjustment section that adjusts a specific image signal, which is one out of the first through the third image signals and corresponds to the electro-optical device that receives one residual color light not passing through the relay optical system, a degree of the adjustment being depend on pixel positions of a color image so that cross sectional luminance distributions of the first through the third modulated lights on a light-exiting side of the color light synthesizing optical system have substantially same gradients at least when the first through the third image signals reproduce a white image.

9. The projector in accordance with claim 8, wherein the one residual color light not passing through the relay optical system is a color light having the highest luminance among the first through the third color lights.

10. The projector in accordance with claim 8, wherein the adjustment section carries out the adjustment according to the pixel positions of an image only when values of pixels constituting the specific image signal of interest are within a preset range of relatively high luminance.

11. The projector in accordance with claim 8, wherein the illumination optical system comprises:

a light source;

a lens array that divides a light bundle emitted from the light source into a plurality of sub-beams; and a superimposing lens that causes the plurality of sub-beams output from the lens array to be superimposed in the first through the third electro-optical devices.

12. A projector that projects and displays a color image, the projector comprising:

an illumination optical system that emits illumination light;

a color light separation optical system that divides the illumination light emitted from the illumination optical system into first through third color lights, which respectively have three different color components;

first through third electro-optical devices that respectively modulate the first through the third color lights, which are separated by the color light separation optical system, in response to first through third image signals and thereby generate first through third modulated lights;

a color light synthesizing optical system that synthesizes the first through the third modulated lights with one another and emits synthesized light;

a projection optical system that projects the synthesized light emitted from the color light synthesizing optical system;

relay optical systems that are respectively provided in two optical paths selected out of three optical paths, which respectively connect the color light separation optical system with the first through the third electro-optical devices, each relay optical system regulating a size of a light bundle of a selected color light; and an adjustment section that adjusts specific image signals, which are two out of the first through the third image signals and correspond to the electro-optical devices that receive the two selected color lights passing through the relay optical systems, a degree of the adjustment being depend on pixel positions of a color image so that cross sectional luminance distributions of the first through the third modulated lights on a light-exiting side of the color light synthesizing optical system have substantially same gradients at least when the first through the third image signals reproduce a white image.

13. The projector in accordance with claim 12, wherein the adjustment section carries out the adjustment according to the pixel positions of an image only when values of pixels constituting the specific image signal of interest are within a preset range of relatively high luminance.

14. The projector in accordance with claim 12, wherein the illumination optical system comprises:

a light source;

a lens array that divides a light bundle emitted from the light source into a plurality of sub-beams; and a superimposing lens that causes the plurality of sub-beams output from the lens array to be superimposed in the first through the third electro-optical devices.

* * * * *